(12) United States Patent
Wong et al.

(10) Patent No.: US 9,568,389 B2
(45) Date of Patent: Feb. 14, 2017

(54) BLAST EXPOSURE RECORDING DEVICE

(75) Inventors: Doug Wong, Ottawa (CA); Aristidis Makris, Ottawa (CA); Gordana Jeftic-Stojanovski, Kanata (CA)

(73) Assignee: Med-Eng, LLC, Jacksonville, FL (US)

( * ) Notice: Subject to any disclaimer, the term of this patent is extended or adjusted under 35 U.S.C. 154(b) by 223 days.

(21) Appl. No.: 14/401,187

(22) PCT Filed: May 15, 2012

(86) PCT No.: PCT/CA2012/050319
§ 371 (c)(1),
(2), (4) Date: Nov. 14, 2014

(87) PCT Pub. No.: WO2013/170339
PCT Pub. Date: Nov. 21, 2013

(65) Prior Publication Data
US 2015/0143875 A1   May 28, 2015

(51) Int. Cl.
*G01L 5/14* (2006.01)
*G01P 15/00* (2006.01)
*G01L 23/00* (2006.01)

(52) U.S. Cl.
CPC *G01L 23/00* (2013.01); *G01L 5/14* (2013.01)

(58) Field of Classification Search
CPC .............. G01L 5/14; G01L 5/00; G01L 23/00; G01P 15/00; G01P 15/08; G01P 15/18; G01P 1/12
See application file for complete search history.

(56) References Cited

U.S. PATENT DOCUMENTS 8,554,509 B2 * 10/2013 Crisco, III ............. A42B 3/046
2/425

8,984,664 B2 * 3/2015 Moss ..................... A42B 3/046
2/6.1
2009/0000377 A1 * 1/2009 Shipps ..................... A61B 5/11
73/514.16
2013/0054180 A1 * 2/2013 Barfield .............. G01P 15/0891
702/138
2013/0321168 A1 * 12/2013 Mahony ................. A61B 5/002
340/870.09

FOREIGN PATENT DOCUMENTS

| CA | 2708012 A1 | 6/2009 |
|---|---|---|
| EP | 1947424 A2 | 7/2008 |
| WO | 2009070887 A1 | 6/2009 |

OTHER PUBLICATIONS

European Patent Appln. No. 12876705.0—European Search Report dated Jan. 5, 2016.
PCT Application No. PCT/CA2012/050319, International Search Report and Written Opinion dated Jan. 29, 2013.

* cited by examiner

*Primary Examiner* — Nguyen Ha
(74) *Attorney, Agent, or Firm* — Kane Kessler, P.C.; Paul E. Szabo (57) ABSTRACT

A blast pressure recording device and method includes at least one first sensor for measuring a parameter indicative of a blast event, at least one comparator in communication with the at least one first sensor for determining whether said parameter indicative of a blast event exceeds a predetermined threshold, at least one second sensor for measuring blast pressure, a power control means providing power to the at least one second sensor only when the predetermined threshold is exceeded, and a controller for receiving and recording blast pressure.

14 Claims, 6 Drawing Sheets

BLAST EXPOSURE RECORDING DEVICE

FIELD OF THE INVENTION

The invention relates to the field of data measuring and recording devices for military and/or emergency services personnel, and more particularly to a blast exposure recording device for measuring and recording frequent exposures to low levels of blast, shockwave or other impacts.

BACKGROUND OF THE INVENTION

Devices for measuring and recording the data for injury analysis are generally known in the art, and have been used in various defense, emergency personnel, and violent sporting applications. Typical prior art devices are designed to identify specific impacts that may result in possible injury, such as brain injury, to a wearer without the wearer being immediately aware of the injury. For example, sensors for identifying whether an event that is likely to have caused a concussion are known in the art. Furthermore, devices for recording data from high impact events such as direct or near direct explosive blasts are known in the art. These sensors or data recording devices are generally designed around identifying instances of severe blasts or to otherwise continually record particular data being sensed.

There is a need in the art for a personal body worn blast recorder that may be used by a variety of personnel associated with first responder and military communities, and in particular to monitor personnel involved in frequent exposures to low level blast, such as in explosive breaching, forced entry, tactical team training, training centers for the controlled use of explosives or blast weapons, or firing of large weapons, etc. There has been a need from an occupational health and safety perspective to capture the total blast exposure over time of individuals exposed to low levels of controlled blast. In recent years, various studies have documented a degradation in physiological performance for individuals exposed to frequent blast events in training schools. Tactical (or SWAT) teams involved in dynamic entry involving explosive breaching undergo much live training with low level blast. In addition to medical symptoms, there is a need to optimize positioning, tactics, techniques and procedures associated with explosive entry in a quantitative manner. There is a need in the art for a portable and versatile blast recording device that permits a team to improve their safety from blast exposure, while recording the total blast exposure over time.

Additionally, prior art devices have been unable to consistently and over a long period of time in training or in the operating theatre record blast exposure for victims of accidental blast or attack events involving first responders or military personnel, such as those from terrorist devices, improvised explosive devices, military confrontations, EOD, etc.

Furthermore, prior art devices are often difficult to wear on the person being monitored, particularly in a removable or transportable manner, and are intrusive in respect of operations being undertaken. Furthermore, they are deficient in providing a repeatable technique for quantitative and cost effective capture of blast pressure exposure in realistic field operations, and particularly with respect to continuous capture of low level blast events.

There is therefore a need in the art to address one or more of the above identified problems with prior art devices.

There is also a need in the art for a blast monitoring and/or recording devices to monitor and/or record low level blasts.

SUMMARY OF THE INVENTION

It is one object of the invention to provide a blast exposure recording device to monitor and/or record exposure to low level blast events. It is another or alternate object of the invention to provide a monitoring and recording device for recording data from events occurring during military, emergency services or equivalents thereof operations. It will be understood by a person skilled in the art that embodiments of the invention may fulfill any one of the objects of the invention or combinations thereof, and address any one or more of the above-identified deficiencies with the prior art.

According to one embodiment of the invention, there is provided a blast event recording device including at least one first sensor for measuring a parameter indicative of a blast event, at least one comparator in communication with the at least one first sensor for determining whether the parameter indicative of a blast event measured by the at least one first sensor exceeds a predetermined threshold, at least one second sensor for measuring a blast event parameter, a power control means providing power to the at least one second sensor only when the predetermined threshold is exceeded, and a controller for receiving and recording the blast event parameter measured by the at least one second sensor. Typically, the at least one second sensor will consume more power than the at least one first sensor.

According to an aspect of the invention, the at least one first sensor is at least one accelerometer and the parameter indicative of a blast event comprises acceleration.

According to another aspect of the invention, the at least one second sensor is a pressure sensor and the blast event parameter comprises pressure.

According to another aspect of the invention, the at least one accelerometer is an accelerometer arranged to measure acceleration in the x direction.

According to another aspect of the invention, the at least one accelerometer is three accelerometers arranged to measure acceleration in the x, y, and z directions, respectively.

According to another aspect of the invention, the power control means is a power control circuit and a power source.

According to another aspect of the invention, the controller includes a data recording means for recording data from the at least one second sensor.

According to another aspect of the invention, the data recording means is further adapted to record data from the at least one first sensor.

According to another aspect of the invention, the power control means provides power to the controller only when the predetermined threshold is exceeded.

According to another aspect of the invention, the power control means includes first power control means for providing power to the at least one second sensor and second power control means for providing power to the controller.

According to another aspect of the invention, the predetermined threshold is 10 g.

According to another aspect of the invention, the controller further comprises a temperature sensor.

According to another embodiment of the invention, there is provided a blast event recording device including at least one first sensor for measuring a parameter indicative of a blast event, at least one comparator in communication with the at least one first sensor for determining whether the parameter indicative of a blast event measured by the at least one first sensor exceeds a first predetermined threshold, and for determining whether the parameter indicative of a blast event further exceeds a second predetermined threshold, at least one second sensor for measuring a blast event parameter, a controller for receiving and recording the blast event parameter measured by the at least one second sensor, a power control means providing power to the at least one second sensor only when the first predetermined threshold is exceeded, wherein the power control means further providing power to the controller only when the second predetermined threshold is exceeded.

According to an aspect of this embodiment, the at least one first sensor is at least one accelerometer and the parameter indicative of a blast event comprises acceleration.

According to another aspect of the invention, the at least one second sensor is a pressure sensor and the blast event parameter comprises pressure.

According to another aspect of the invention, the at least one accelerometer is an accelerometer arranged to measure acceleration in the x direction.

According to another aspect of the invention, the at least one accelerometer includes three accelerometers arranged to measure acceleration in the x, y, and z directions, respectively.

According to another aspect of the invention, a power control circuit is provided adapted to provide power to the at least one second sensor to thereby activate the at least one second sensor when the predetermined threshold is exceeded.

According to another aspect of the invention, the controller includes a data recording means for recording data from the at least one second sensor.

According to another aspect of the invention, the data recording means is further adapted to record data from the at least one first sensor.

According to another aspect of the invention, the first predetermined threshold and the second predetermined threshold comprise the same value.

According to another aspect of the invention, the first and second predetermined thresholds are 10 g.

According to another aspect of the invention, the first predetermined threshold is less than the second predetermined threshold According to another aspect of the invention, the first predetermined threshold is approximately 10 g.

According to another aspect of the invention, the second predetermined threshold is approximately 100 g.

According to another aspect of the invention, there is provided a counting means for counting the number of times the first threshold is exceeded and the number of times the second threshold is exceed.

According to another embodiment of the invention, there is provided a method for recording blast pressure including measuring a parameter indicative of a blast event, determining if the parameter indicative of a blast event exceeds a predetermined threshold, measuring and recording blast pressure only if the parameter indicative of a blast event exceeds the predetermined threshold.

According to an aspect of the invention, the parameter indicative of a blast event is acceleration.

According to another aspect of the invention, the method further includes recording the acceleration.

According to another aspect of the invention, the method further includes controlling the power provided to a sensor carrying out the step of measuring and recording blast pressure only if the parameter indicative of a blast event exceeds the predetermined threshold.

According to another aspect of the invention, the predetermined threshold is 10 g.

According to another embodiment of the invention, there is provided a method for recording blast pressure including measuring a parameter indicative of a blast event, determining if the parameter indicative of a blast event exceeds a first predetermined threshold, measuring blast pressure only if the parameter indicative of a blast event exceeds the first predetermined threshold, determining if the parameter indicative of a blast event exceeds a second predetermined threshold, recording the blast pressure only if the parameter indicative of a blast event exceeds the second predetermined threshold.

According to an aspect of the invention, the parameter indicative of a blast event is acceleration.

According to another aspect of the invention, the first predetermined threshold is approximately 10 g.

According to another aspect of the invention, the second predetermined threshold is approximately 100 g.

According to another aspect of the invention, the method further includes counting the number of times the first predetermined threshold has been exceed and the number of times the second predetermined threshold has been exceeded.

According to another embodiment of the invention, there is provided a method for analyzing the impact of blast events on a military unit that includes a plurality of one or more of military individuals and vehicles comprising outfitting each of the one or more of military individuals and vehicles with the device as herein described, merging data received from each the device in a common database and analyzing the merged data.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION

The blast exposure recording device as herein described is particularly useful in measuring and recording data from continuous or period low level blast events that are not necessarily injurious to a person on a per event basis. While the device herein described will also record data from more serious and directly injurious events, it is particularly useful in maintaining continuous operations over long periods of time and recording incidents occurring due to low level blast events. The data recorded can also be eventually used for medical triage and other forensic purposes, post blast. While there is no universally agreed upon injury mechanism for consistent low level blast exposure, that is exposure to incidents that do immediately cause an injury or other catastrophic event, the predominant theories and studies on blast injuries point to inputs of blast overpressure exposure of the thorax, and acceleration and compression of the thoracic wall as key measurements that ultimately result in injury or other degradation in physiological performance for individuals exposed to blast events. Accordingly, in order to provide some initial measurement capabilities for blast parameters that can influence injury outcome, the invention aims to capture and record blast overpressure and acceleration.

As the invention, in its preferred use, is to a data recording device that can be worn directly on a person, it is preferred that the device be produced in a form that permits for easy attachment and detachment to a piece of clothing worn by a user. Other applications of the invention also include the use of same of military or other equipment that may also suffer in performance due to repeated exposure to low level blast events. For example, the invention may be provided on a vehicle to record exposure to blast events and the ultimate degradation in performance of the vehicle over time as continued exposure occurs. It will be understood by a person skilled in the art that the invention is not limited to any of the applications or uses described herein and various adaptations are contemplated by the applicants, limited only by the claims that follow this description.

With reference to the summary of invention described above, various broad aspects of the invention have been identified. Below follows a description of the preferred embodiments for implementing the invention in accordance with providing one or more of the benefits over the prior art as herein described. In particular, the invention provides for a device that includes a first sensor for identifying the onset of a blast event and a second sensor that measure data from the blast, for subsequent recordal and processing by a controller forming part of the device. Power is generally only provided to the first sensor and to a real time clock during normal, steady state operation. Once the onset of a blast is detected, power is also provided to the second sensor that measure data from the blast and to the controller for recording and processing the blast data. It is also preferred that the first sensor also measure data that would be beneficial to record during a blast event. Typically, the first sensor would be measuring acceleration and the second sensor would be measuring pressure. Various other possible advantages over the prior art will become evident in view of the preferred implementations of the invention as described below.

Figure 1:
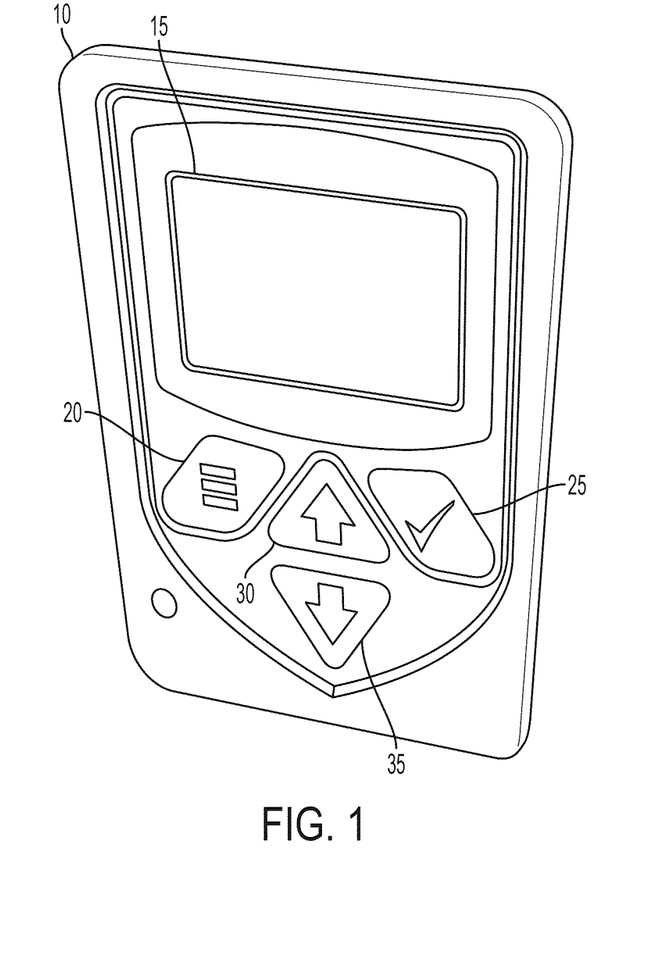
FIG. 1 is a perspective view of an exemplary low-level blast recording device according to the invention.

Referring now to FIG. 1, there is shown one embodiment of the invention where a blast exposure recording device 10 includes a housing having a display 15 and various user accessible buttons 20, 25, 30 and 35 for interacting with the device 10. The device 10, when incorporating the features as herein described, provides for a small, light-weight and self-contained digital recording system. A pressure sensor port is also provided on the device 10 to provide air pressure access to a pressure sensor locating within the housing, details of which are described and illustrated below. In practice, the device 10 is preferably about the size of a pager or small mobile telephone, and should be of minimal weight so as to minimize the impedance caused to the wearer during mission or emergency services personnel duties. The ability to maintain the small size and weight is aided, in part, by the internal design of the invention, a description of which follows below. Also relevant to the invention, although not essential in all embodiments described, is the ability to provide for continuous operation over extended periods of time. For example, military personnel may be in live action for extended periods of time that would typically exceed the time prior art sensing and data recording devices would be able to operate. The invention therefore also provides for a combined sensing and power management approach to data recording that results in identifying only those events that qualify as low level blast impacts to be recorded. Therefore, it is conceivable in some embodiments that the device is not fully operational at all times in order to conserve battery and/or charge power. Preferred embodiments as to how to implement these features are also described below.

The buttons 20, 25, 30 and 35 can be used for allowing user access to power on or power off the device, scroll through information displayed on the screen, retrieve data that has been recorded and/or perform calibration functions as prompted by instructions on the screen.

Figure 5A:
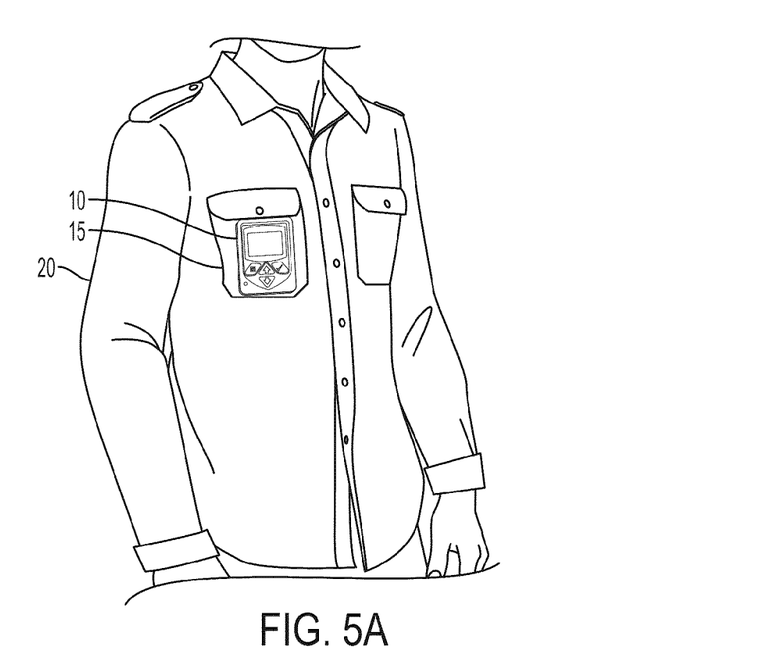
FIGS. 5A and 5B illustrate exemplary uses of the device of FIG. 1 on an individual.
Figure 5B:
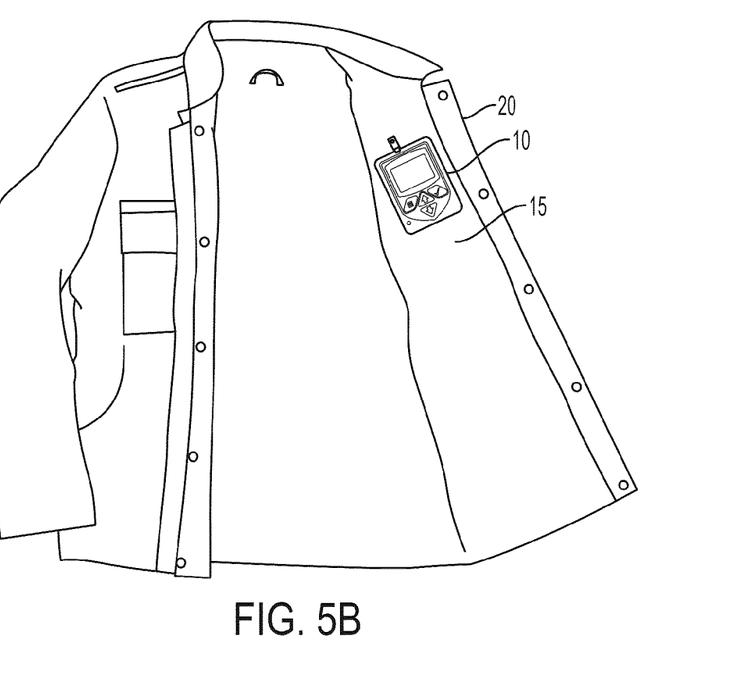
Figure 6:
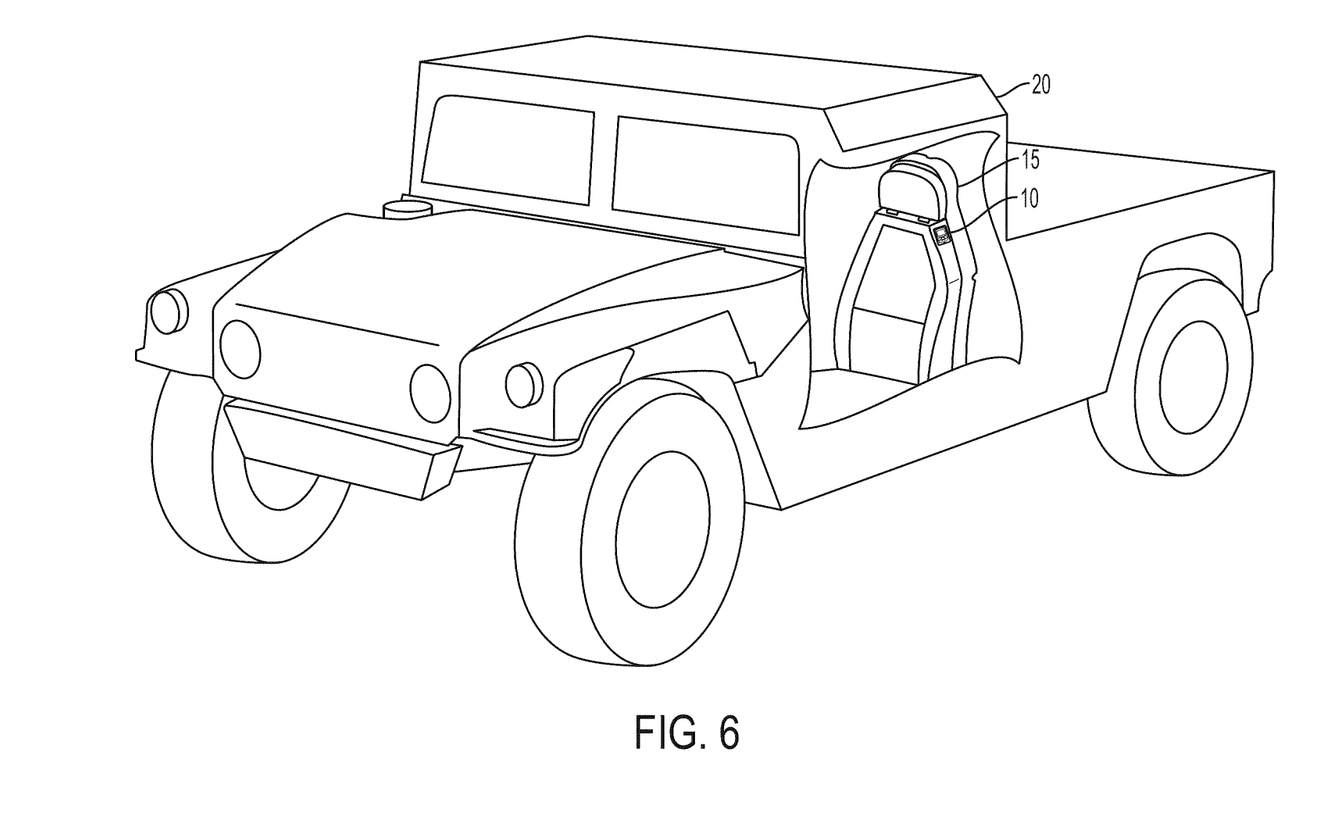
FIG. 6 illustrates a alternative use of the device of FIG. 1 on a vehicle.

As illustrated in FIGS. 5A and 5B, the recording device 10 may be positioned within a pocket 15 of a user's garment 20. The garment 20 may be a military uniform, an emergency services personnel uniform, a protective garment, a bomb disposal suit, or similar garments, notwithstanding the illustrated embodiment depictured. FIG. 5B shows an embodiment where the device 10 is installed in the mesh lining of the jacket 20. In other embodiments, the device 10 may be worn on a shoulder portion of the garment or attached to a head protector, such as a helmet. As shown in FIG. 6, the recording device 10 may also be installed on the seat of a vehicle, for example a military vehicle.

Figure 2:
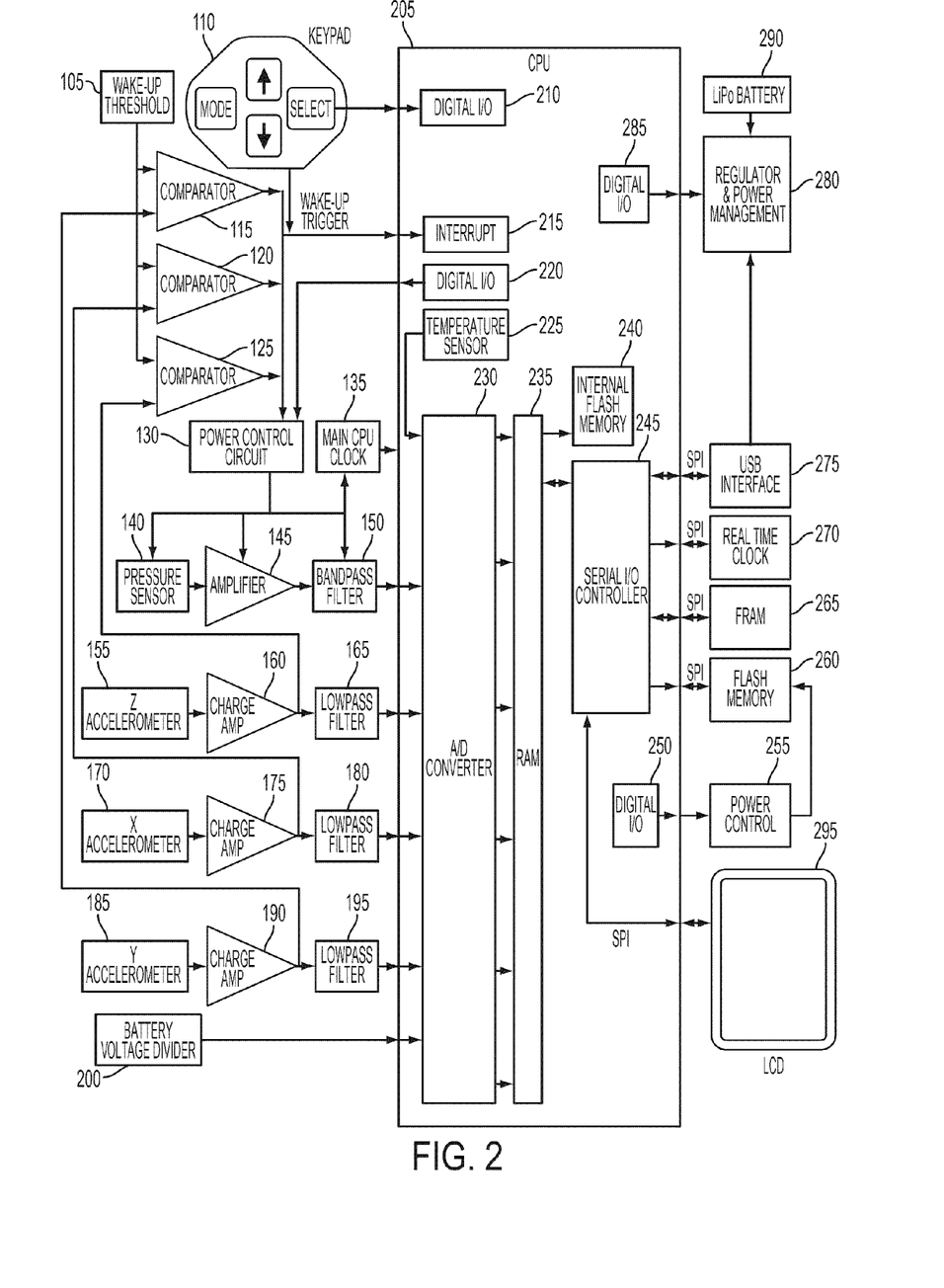
FIG. 2 is a schematic view of the of the internal elements of the device of FIG. 1.

Within the housing, there are provided sensing, recording, control and power management elements that work together to provide the functions of the device 10 used to implement the invention. Referring now to FIG. 2, there is shown a schematic view of the elements of the invention internal to the housing of FIG. 1. Various sensing elements 140, 155, 170, 185 are provided in communication with a controller, illustrated as a CPU 205, and powered by various power management elements 290, 280. The sensing elements 140, 155, 170, 185 are shown in more detail in FIG. 4. The CPU and controller elements are shown in more detail in FIG. 3. Software is also provided within the controller 205 to manage the storing and analyzing of data captured by the device 10. Details of the software and preferred implementations of its functionality are described further below.

Internal Component Descriptions

Figure 4:
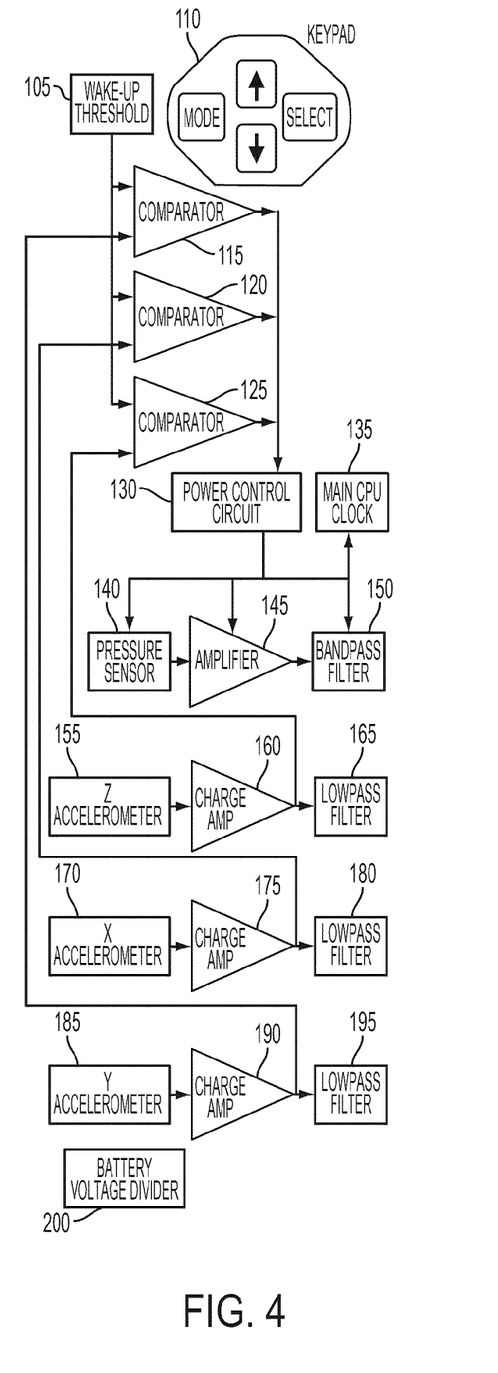
FIG. 4 is a detail schematic view of the sensor portion of the device of FIG. 1.

Referring now to FIG. 4, there is shown three accelerometers 155, 170, 185 arranged orthogonally to each other to measure accelerations in the x, y, and z directions, respectively. The accelerometers 155, 170, 185 are provided to detect the onset of a violent event, and particularly a low level blast event. While the preferred embodiment illustrates three accelerometers 155, 170, 185, it is also contemplated that the invention will also operate with only a single accelerometer 185 measuring accelerations in the x direction, where the x direction is generally parallel with the direction in which air flows through the device to reach the pressure sensor. That is, the z direction is typically orthogonal to the ground. Alternatively, a single omni-direction accelerometer may also be used. Accelerometers in general are lower power consumption devices than other sensing elements, and particularly are lower power consumption devices than the pressure sensor used to measure blast pressure. Accordingly, the accelerometers are preferably operated at all times when the device is in use. The invention provides for the accelerometers 155, 170, 185 to be used, at least in part, as an event triggering indicator, while also recording acceleration data. In the preferred embodiment, once the accelerometers 155, 170, 185 register an event, for example by recognizing an acceleration greater than a threshold value, a "wake-up" signal is sent to activate the more power intensive elements and functions of the recording device. The accelerometers 155, 170, 185 are preferably piezo-electric accelerometers, for example, due to their relatively low power consumption and ability to trigger on a shock wave, and therefore initiate the wake-up signal required, while consuming small amounts of power to operate during times when no blast event is occurring. Typically, data will be recorded from the accelerometers 155, 170, 185 at the same sampling frequency as data is recorded from the pressure sensor (described below) to generate the pressure signal. Ultimately, this permits the accelerometers to serve as both trigger devices, and complementary sensors for data recordal of the blast events. Four-pole low-pass filters 165, 180, 195 with a cutoff frequency of, for example, 8 kHz, are used to minimize sample aliasing, while allowing for a maximum trigger signal. In illustrative embodiments, the resolution of the accelerometers 155, 170, 185 should be 1 g or better, and each should have an accuracy of +/−5 g up to 100 g and 10% of the reading above 100 g. Accelerometers meeting these specifications are described for illustrative purposes only, and are not to be considered as limiting on the invention.

Figure 3:
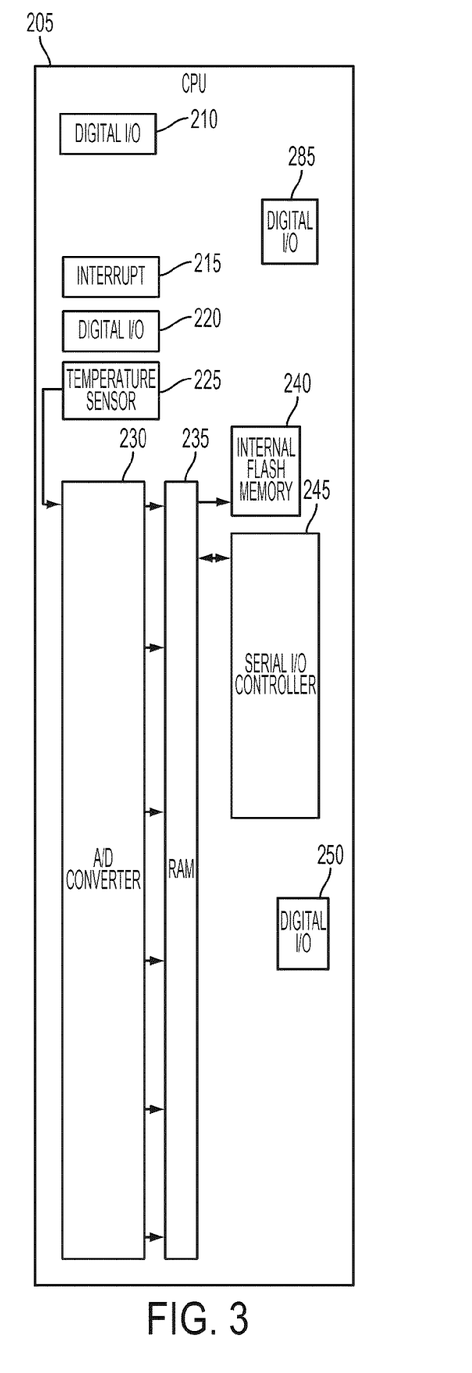
FIG. 3 is a detail schematic view of the controller portion of the device of FIG. 1.

A wake-up threshold 105 is predetermined and stored within the device 10, and constantly being compared with signals from the accelerometers 155, 170, 185 by comparators 115, 120, 125 as illustrated. Once the accelerometers 155, 170, 185 identify the possible occurrence of an event by sensing an acceleration that exceeds the wake-up threshold value, as determined by the comparators 115, 120, 125, the power control circuit 130 activates power to the pressure sensor 140, and related elements. In addition, a wake-up trigger is sent to the controller/CPU 205, by activating the interrupt 215. Accordingly, the higher power consuming pressure sensor 140 is activated so that blast pressure can begin to be recorded. The pressure sensor 140 is preferably a piezo-resistive bridge, such as a silicon strain gauge, sensor capable of measuring absolute pressure. One example of a pressure sensor v that may be used in the GE™ Novasensor model number NPP-301. This type of sensor 140 provides an accurate linear output with a suitable frequency response capable of handling a direct pressure of 7 Bar, considered to be appropriate for the blast exposures being recorded by the device of the invention. As pressure sensors capable of providing the types of results required to measure low level blast exposures have a relatively high current draw, the pressure sensor 140 is only activated during an event, following the "wake-up" signal being triggered by the accelerometers 155, 170, 185.

Preferably, the pressure sensor 140 includes sufficient internal protection to make it splashproof to IP65. IP ratings specify a level of solid particle protection and liquid ingress protection, and are generally known in military applications. A four-pole low pass filter 150 with an 8 KHz cutoff frequency, for example, is preferably used to minimize sample aliasing. The pressure sensor 140 sample rate, and therefore the accelerometer 155, 170, 185 sample rate is preferably at least 24 kHz to meet the reaction time required for the sensor to be operable following an event occurring, as will be described further below. Various charge amplifiers 145, 160, 175, 190 may be connected in series with any of the sensors to amplify the sensed signal. The operation of such amplifiers and previously described low pass or band pass filters are generally known to a person skilled in the art, and therefore are not described in further detail herein. A manual wake-up trigger may also be provided by way of the keypad 110. In this instance, the recording device can be forced into pressure data recording mode, for example, in environments where power management is not an issue or where live operations are expected to last for only a short period of time.

A real time clock 270 is provided to operate at all times and preferably maintains an accuracy of 0.5 seconds per week or better. The real time clock 270 is preferably also used to apply a time stamp to every recorded event with a resolution of, for example, 1 ms. A resolution in this order is relevant in situations where more than one event occurs in a given second, as is commonplace during blast events. It is preferable that crystal clocks are not used during event recording as it has been shown that crystals may have unpredictable or indeterminate operation under high acceleration, including completely ceasing to oscillate for short periods of time. A sampling clock 135 is also provide, the functions of which are generally well known in the art. However, for the preferred embodiment, the sampling clock should have an accuracy better than 0.1 ms over 15 ms.

The controller or CPU 205 is preferably adapted to carry out computer readable instructions as stored on a computer readable medium to carry out particular method steps for implementing the invention as herein described. Within the controller 205 is an analogue to digital converter 230 to convert analogue signals received by the sensor elements to digital signals that can be processed by the controller 205. Also provided are non-volatile memory such as internal flash memory 240 and random access memory (RAM) 235 for use by the CPU within the controller 205. Various input/output interfaces 210, 285, 245, 250 allow for input to be received from one or more devices, such as the keypad 110, and outputs information to output devices, such as a display 295, and power control elements 280, 255. A network interface may be provided to enable communication with other systems, for example via USB ports 275. Non-volatile storage means stores the operating system and programs, and is preferably a solid state drive. A serial input/output controller 245 controls communication with various devices external to the controller 205 itself, as illustrated. The generally arrangement and functioning of these elements within the controller will be apparent to one skilled in the art upon reading this description and are therefore not described in significant detail herein.

Preferably, the controller 205 also includes a temperature sensor 225, preferably built in to the controller, and in communication with the converter 230 for storing temperature data in RAM 235. The temperature during blast event recordings is recorded, and preferably to a resolution of approximately 1 degree Celsius. Battery voltage is also preferably recorded at each event with an accuracy of +/−0.05 volts and a resolution of 0.1 volts.

The device is preferably calibrated using known prior art techniques of applying offset and scaling factors for both pressure and acceleration. While the calibration can be done in any environment, the offset and scaling factors are preferably stored in the device's non-volatile memory.

A power supply 290 is provided and adapted to power the device over extended periods of time, particularly when in the operating theatre. While various power supplies may be used, the preferred power supply includes a lithium polymer battery 290 with its recharging managed by an on-board power management integrated circuit 280. Lithium polymer batteries are selected for their power density and safety, which are both particularly advantageous during extended military operations. The battery power may be turned on by a self latching circuit based on a preselected user input. Similarly, power can be switched off by another preselected user input. However, the power off function is preferably arranged to be more difficult to initiate in order to prevent accidental shutting off of the device during active use. The power supply 290 is preferably adapted to be recharged by either the USB interface 275 and/or via wireless inductive coupling (not shown).

The display 295 is preferably a heavy duty one that can withstand field operations for military and emergency services personnel operations. In a preferred embodiment, the display is one such as the Nokia™ 3310 having an SPI interface with the capability to display at least 6 lines of 14 characters per line. A resolution of 84×84 pixels would typically be sufficient to the type of information displayed. Of course, the invention is not limited to this type of display and LCD, LED or OLED displays are also contemplated. In the event the screen is a touch screen, a screen lock feature is preferably also implemented. Of course, these alternate types of screens generally consume more power and thus are generally not preferred.

The device may have any number of communications means for importing or transferring data for analysis to other devices. For example, a USB port 275 may be provided, as may wireless communications functionality, such as Bluetooth. Various other communications methods and standards may also be implemented, but these are preferred for their widespread use in various possible host systems.

Event Triggering

As previously discussed, one of the key differences between the invention and the prior art is the event triggering functionality enabled by the above-described system. The event triggering is arranged to provide for extended recording use of the device, particularly for low level blast events by controlling how the sensors described above are arranged, activated and used to initiate the power consuming features of the device.

In particular, a typical blast event for which the invention is most likely to encounter includes a sharp pressure spike followed by a slower partial vacuum. As these blast events, whether significant or low level are not constantly occurring, the device should not be recording pressure all the time as this type of recording uses significant power resources. Accordingly, there is provided two modes in which the device described above is adapted to operate. In a first mode, the device is on an effective stand-by mode with only the accelerometers measuring data and the controller only being activated when a shock is detected; and in the second mode, the controller and other data recording facilities of the invention are fully activated to continuously monitor and record pressure measurements until a predetermined threshold is exceeded. In the first mode, it should be noted that the accelerometers are fully powered, as is the real time clock.

In this embodiment, if the controller is to be awakened before starting to capture pressure samples by a shockwave signal, there will be provided a low power sensor that is always monitoring for an event. These low power sensors could be the accelerometers described above.

As is generally illustrated by the method of FIG. 7, when the system is active at step 705, the accelerometer is constantly sensing accelerations at step 710. If a wake-up threshold of acceleration is exceeded at step 715, a wake-up signal is sent 720 to turn on the pressure sensor 725 and activate all features of the controller at step 730. Thus, during a blast event, each of pressure data and acceleration data are recorded at step 735.

Optionally, a user-activated, always on recording mode may also be provided, as an additional feature, in a manner selectable on the keypad. In this option, the device is always on measuring both pressure and acceleration continuously. While all data may not be recorded, most recent samples may be stored in a buffer so that they may be saved if a threshold pressure trigger is encountered. Thus, while the sensors are always on, not all the recording facilities are in use until a threshold pressure is reached. This will ensure that pre-blast pressures are also recorded to provide a baseline reading. In this mode, a running average pressure may be used as a baseline for comparison. If the instantaneous pressure exceeds the long term average pressure by a preset threshold amount, a 15 ms (for example) record will be saved, including a predetermined number of pre-threshold samples of both acceleration and pressure. It has been found that recording approximately 16 pre-threshold samples provides sufficient data for further analysis.

When in the first mode, the device is preferably adapted to wake up within 50 microseconds after any accelerometer signal exceeds a predetermined amount. It is preferable that this predetermined amount is 10 g, as it has been found that this degree of low level blast pressure is that at which physiological damage may begin to occur. A higher predetermined amount may be required in certain operations if it is found that too many spurious triggers are activated. In other instances this amount may be lowered to capture greater pressure data. Optionally, and to identify the operating conditions under which the device is being used in a manner that captures this information in a useful way, the number of wake-up triggers are counted and stored. This is preferably the case even if no further data is recorded beyond the wake-up trigger. Events captured when the device is in the first mode are preferably only saved if the pressure differential exceeds a predetermined amount, for example 0.04 Bar, where the pressure differential is the difference between the maximum pressure and the minimum pressure in the 15 ms of data that is recorded. For events that do not exceed the pressure deferential, there may still be some data saved. For example, the wake up counter may be incremented and saved, and if the peak acceleration exceeds the maximum peak experienced thus far, it may be worthwhile to record the new peak acceleration.

Once the blast event has passed, pressure and acceleration is preferably extrapolated back to quiescent values to minimize the effects of missed data prior to the trigger being exceeded. For example, if the device is in the first mode and it starts recoding samples because the acceleration exceeded 10 g, but the firmware acceleration trigger level is set to 100 g, the saved data will include all samples including those taken below 100 g and there will also be included an extra initial sample of zero g. A separate firmware acceleration trigger may be applied to capture data from more severe blasts only, even if the wake up signal from the accelerometers is set at a much lower threshold. In this alternative, there is a gap between the threshold required to initiate the wake up of the controller and the threshold required to begin recording pressure data.

Construction of the Device

The blast exposure recording device according to the invention is preferably sized, designed and otherwise dimensioned to withstand significant impacts and variations in operating environments, specifically with respect to military applications. For example, it is preferably that the device is able to survive, record and continue operating following an event that results in an acceleration of 2000 g for 1 ms. The housing itself can be rated at IP67, for example and all ports, such as the USB port, should have a gasketed cover. The housing is also preferably non-flammable or self-extinguishing, and is designed such that any glass elements such as that on the display, are contained within the housing following a blast event, including excessive blast events that cause damage to the device itself. Many of these requirements may be summarized by designing the device to be compliant with MIL-STD 810 and MIL-STD 461. It will be appreciated by a person skilled in the art that these details of construction are described to illustrate certain embodiments, but are in no way to be considered limiting on the invention claimed.

Software, Recorded Data and Data Storage

Other unique aspects of the invention are found in the operating methods of the device described above, as embodied by the software operating the device, the information being recorded and how this information is processed and stored. Due to the environment in which the device is intended to operate, these aspects of the invention are designed specifically for the recording and processing of low-level blast information, although they are also applicable to the recording and processing of other types of blast information that the device of the invention may also record.

Several types of data may be stored in the non-volatile memory of the device including, but not limited to, event data such as acceleration and pressure waveforms, calibration constants, recording thresholds, the device serial number, a user ID string, the device model number, firmware and hardware version numbers and a diagnostics log. While some of these parameters may be known to a person skilled in the art to be stored in non-volatile memory of a data recording device, the storage of acceleration and pressure wave forms in combination with the methods and device for obtaining same is believe to be an improvement over the prior art as it pertains to the data recording of low-level blast impacts.

Additionally, there is optionally stored on the non-volatile memory or other computer readable medium in communication with the device, such as a memory card, another computer, a central server, or other machine readable storage facility, a database including event data recording by the device as herein described. That is, the database may be organized entirely or in part on the device itself, or in the alternative, may be organized entirely or in part on a separate computer or computer readable medium that is able to communicate with the device itself. The database may include fields that contain the information identified above as being stored in the non-volatile memory of the device. In addition, and with specific respect to the data being recorded to analyze the low-level blast event, it is preferably that the database include therein fields containing information of one or more of peak overpressure, event type, event duration, impulse magnitude, peak acceleration, peak resultant speed, resultant velocity direction, corrected pressure, corrected impulse magnitude, a time stamp, temperature, pressure waveform data, accelerometer waveform data, battery voltage, calibration data and recording thresholds. Each of these types of data may be generated based on actual time, temperature, acceleration and pressure data that has been measured by the device itself, and without any further need for user input or additional, optional measurements.

In addition, other data that may prove useful and could be stored in the database, either derived from additional functionality provided to the data recording device of the invention, or by way of supplementary devices for recording additional information include GPS coordinates, explosive charge size and type, distance to the sensor, location and angle of sensor, event scenario description (as input by a user), personnel and protective apparel description, physiological consequences, symptoms and injuries, entryway description, charge location description, relative geometry description, user or third-part photographs and or voice notes. The recording, storage and analysis of data gleaned from the blast recording device of the invention and stored in this fashion provides for substantive analysis and study of the impact of low level blast events in a manner that has heretofore been unknown in the prior art. For example, by permitting user notes to be entered with respect to specific operating conditions, the actual measured data from a low-level blast can be correlated with user observations in the field to identify certain immeasurable operating environment conditions that may be beneficial for later analysis.

Preferably, the event waveform data that is stored is organized as a set of readings at each sample time. For example, low level blasts occurring over 15 ms could have sample increments of approximately 0.042 ms per sample. Corresponding pressure and acceleration data may then be measured at each of these increments. Each of the calculated pieces of data mentioned above will also be stored at each of these sample increments, and subsequently, the information regarding each can be plotted for further analysis.

Another possible benefit may be derived from a number of individuals operating within a particular unit or squad, each equipped with a recording device according to the invention. In this scenario, data from recording devices on each individual may be collected, and subsequently merged in the database discussed above to evaluate the pressure and acceleration effects on the unit as a whole, for example, different individuals within the unit further from or closer to the source of the blast may experience different levels of pressure and acceleration, and it would be beneficial to be able to combine this information in a manner that permits the unit as a whole to be modeled and observed with respect to blast data.

Furthermore, this application may be extended to the case where individuals are located within a vehicle or other type of moving or stationary enclosure. It is contemplated that the vehicle itself, seats upon which the individuals may be location and the individuals themselves may be outfitted with the device according to the invention. In this manner, blast data may be obtained from a plurality of elements within the unit and subsequently merged into the database structure described above for generating data for the analysis of how blast events, and in particularly, low level blast events impact the operating unit as a whole.

In view of the above-described device, systems and operations, the invention also provides for a method for recording blast pressure including measuring a parameter indicative of a blast event, determining if the parameter indicative of a blast event exceeds a predetermined threshold, measuring and recording blast pressure only if the parameter indicative of a blast event exceeds the predetermined threshold. The parameter indicative of a blast event is typically acceleration, which may optionally be recorded.

The method includes controlling the power provided to a sensor carrying out the step of measuring and recording blast pressure only if the parameter indicative of a blast event exceeds the predetermined threshold. Accordingly, the overall pressure consumption of the blast recorded device can be limited, which is particularly beneficial to extended military missions. Typically, the predetermined threshold is 10 g.

Alternatively, the method for recording blast pressure includes measuring a parameter indicative of a blast event, determining if the parameter indicative of a blast event exceeds a first predetermined threshold, measuring blast pressure only if the parameter indicative of a blast event exceeds the first predetermined threshold, determining if the parameter indicative of a blast event exceeds a second predetermined threshold, recording the blast pressure only if the parameter indicative of a blast event exceeds the second predetermined threshold. Again, the parameter indicative of a blast event is typically acceleration. In this embodiment, the first threshold may be 10 g, and the second threshold may be 100 g. Furthermore, as described earlier, it would be beneficial to also count the number of times the first predetermined threshold has been exceed and the number of times the second predetermined threshold has been exceeded. In this embodiment, the method is particularly beneficial in order to capture data from the early stages of a blast event, by ensuring that the pressure sensors are activated shortly before data recording is activated. In this manner, it is also contemplated that pressure data could be used to supplement the acceleration data in order to identify a blast event occurring. Once a blast event is confirmed, by the above noted predetermined thresholds being exceeded, then full power can be provided to the control and recording facilities of the device as a whole, and maximum power is only consumed during the relatively short interval of a blast event occurring.

According to another embodiment of the invention, there is provided a method for analyzing the impact of blast events on a military unit that includes a plurality of one or more of military individuals and vehicles comprising outfitting each of the one or more of military individuals and vehicles with the device as herein described, merging data received from each the device in a common database and analyzing the merged data.

Other modifications and alterations may be used in the design and manufacture of other embodiments according to the present invention without departing from the spirit and scope of the invention, which is limited only by the accompanying claims.

We claim:

1. A blast event recording device comprising:
   at least one first sensor for measuring a parameter indicative of a blast event;
   at least one comparator in communication with said at least one first sensor that determines whether said parameter indicative of a blast event measured by said at least one first sensor exceeds a first predetermined threshold;
   at least one second sensor that measures a blast event parameter, wherein said at least one second sensor has a higher power consumption than said at least one first sensor;
   a power control providing power to said at least one second sensor only when said first predetermined threshold is exceeded, whereby said at least one second sensor is only consuming power when said first predetermined threshold is exceeded; and,
   a controller that receives and records said blast event parameter measured by said at least one second sensor;
   wherein said comparator determines whether said parameter indicative of a blast event further exceeds a second predetermined threshold, and said power control provides power to said controller only when said second predetermined threshold is exceeded.

2. A blast event recording device according to claim 1, wherein said at least one first sensor comprises at least one accelerometer and said parameter indicative of a blast event comprises acceleration.

3. A blast event recording device according to claim 1, wherein said at least one second sensor comprises a pressure sensor and said blast event parameter comprises pressure.

4. A blast event recording device according to claim 1, wherein said at least one accelerometer comprises three accelerometers arranged to measure acceleration in the x, y, and z directions, respectively.

5. A blast event recording device according to claim 1, wherein said controller includes a data recorder for recording data from said at least one second sensor.

6. A blast event recording device according to claim 1, wherein said controller further comprises a temperature sensor.

7. A blast event recording device according to claim 1, wherein said controller includes a data recorder for recording data from said at least one second sensor.

8. A blast event recording device according to claim 1, wherein said first predetermined threshold is less than said second predetermined threshold.

9. A blast event recording device according to claim 1, further comprising a counter for counting the number of times said first threshold is exceeded and the number of times said second threshold is exceeded.

10. A blast event recording device comprising:
    at least one first sensor for measuring a parameter indicative of a blast event;
    at least one comparator in communication with said at least one first sensor for determining whether said parameter indicative of a blast event measured by said at least one first sensor exceeds a first predetermined threshold, and for determining whether said parameter indicative of a blast event further exceeds a second predetermined threshold;
    at least one second sensor for measuring a blast event parameter, wherein said at least one second sensor has a higher power consumption than said at least one first sensor;
    a controller for receiving and recording said blast event parameter measured by said at least one second sensor;
    a power control means providing power to said at least one second sensor only when said first predetermined threshold is exceeded;
    said power control means further providing power to said controller only when said second predetermined threshold is exceeded.

11. A blast event recording device according to claim 10 wherein said at least one first sensor comprises at least one accelerometer and said parameter indicative of a blast event comprises acceleration.

12. A blast event recording device according to claim 11 wherein said at least one second sensor comprises a pressure sensor and said blast event parameter comprises pressure.

13. A blast event recording device according to claim 11 further comprising a power control circuit adapted to provide power to said at least one second sensor to thereby activate said at least one second sensor when said predetermined threshold is exceeded.

14. A blast event recording device according to claim 13 wherein said controller includes a data recording means for recording data from said at least one second sensor.

* * * * *